United States Patent
Bhodia et al.

(10) Patent No.: US 12,519,689 B2
(45) Date of Patent: Jan. 6, 2026

(54) SYSTEMS AND METHODS FOR OPTIMIZING TELEMETRY CONFIGURATION

(71) Applicant: Juniper Networks, Inc., Sunnyvale, CA (US)

(72) Inventors: Dhaval Bakulesh Bhodia, Bangalore (IN); Ramanath Ashok Nayak, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 335 days.

(21) Appl. No.: 18/455,357

(22) Filed: Aug. 24, 2023

(65) Prior Publication Data

US 2025/0021500 A1    Jan. 16, 2025

(30) Foreign Application Priority Data

Jul. 10, 2023  (IN) .............................. 202311046250

(51) Int. Cl.
*H04L 41/0803* (2022.01)
(52) U.S. Cl.
CPC ................. *H04L 41/0803* (2013.01)
(58) Field of Classification Search
CPC .................................................. H04L 41/0803
See application file for complete search history.

(56) References Cited

U.S. PATENT DOCUMENTS

| 10,367,688 B2 * | 7/2019 | Kaplan | H04L 41/0853 |
| 2018/0322026 A1 * | 11/2018 | Olgiati | G06F 11/3466 |
| 2019/0011904 A1 * | 1/2019 | Wyman | B23P 21/004 |

* cited by examiner

*Primary Examiner* — Terrell S Johnson
(74) *Attorney, Agent, or Firm* — Greenberg Traurig, LLP

(57) ABSTRACT

A computer-implemented method for optimizing telemetry configurations may include enabling, by a computing device, a broadcast multiplexer such that a group of integrated circuits connects to a single channel of an interface controller of the computing device. The method may also include configuring, by the computing device, the group of integrated circuits by simultaneously broadcasting a firmware configuration from the single channel of the interface controller to the group of integrated circuits via the broadcast multiplexer. The method may then include disabling, by the computing device, the broadcast multiplexer such that each integrated circuit in the group of integrated circuits connects to a separate channel of the interface controller. Additionally, the method may include periodically polling, by the computing device, the group of integrated circuits based on a predetermined time interval for each integrated circuit. Various other methods, systems, and computer-readable media are also disclosed.

20 Claims, 6 Drawing Sheets

SYSTEMS AND METHODS FOR OPTIMIZING TELEMETRY CONFIGURATION

CROSS REFERENCE TO RELATED APPLICATION

This application is a continuation of and claims the benefit of Indian Provisional Patent Application No. 202311046250, filed 10 Jul. 2023, the disclosure of which is incorporated, in its entirely, by this reference.

BACKGROUND

With the increasing demands of telemetry, multiple devices or sensors may need to be connected to a control plane. The number of telemetry devices may vary based on system requirements and may number in the hundreds. Due to design requirements, the firmware of these devices may also need to be programmed on power up, which may increase the overall system boot time. When many telemetry devices provide regularly updated telemetry data, runtime polling of devices can greatly increase, thereby also increasing system and resource usage. As more telemetry is added to a system, speed of bootup and efficient telemetry support become increasingly necessary requirements. However, a balance between telemetry acceleration and the ability to download firmware or configure multiple devices is difficult to achieve.

Traditional implementations often support either telemetry acceleration or simultaneous firmware download but not both. For example, some systems may attempt to support simultaneous firmware configuration at the expense of efficient telemetry support, creating a need for sequential telemetry polling. On the other hand, systems that use multiple controller devices and parallel threads to better support telemetry devices and the polling of such devices may also increase the processing load and programmable logic to implement these solutions. Other system designs may only have limited telemetry support and/or may use sequential firmware download. Thus, many traditional implementations are suboptimal and do not provide adequate telemetry support or efficient use of host resources. The instant disclosure, therefore, identifies and addresses a need for additional and improved systems and methods for optimizing telemetry configurations.

SUMMARY

As will be described in greater detail below, the instant disclosure describes various systems and methods for optimizing telemetry configurations by incorporating a combination of broadcast multiplexers with interface controllers. In one example, a computer-implemented method for optimizing telemetry configurations may include enabling, by a computing device, a broadcast multiplexer such that a group of integrated circuits connects to a single channel of an interface controller of the computing device. The method may also include configuring, by the computing device, the group of integrated circuits by simultaneously broadcasting a firmware configuration from the single channel of the interface controller to the group of integrated circuits via the broadcast multiplexer. The method may then include disabling, by the computing device, the broadcast multiplexer such that each integrated circuit in the group of integrated circuits connects to a separate channel of the interface controller. Additionally, the method may include periodically polling, by the computing device, the group of integrated circuits based on a predetermined time interval for each integrated circuit in the group of integrated circuits.

In addition, a corresponding system for optimizing telemetry configurations may include several modules stored in memory, including (i) an enabling module that enables, by a computing device, a broadcast multiplexer such that a group of integrated circuits connects to a single channel of an interface controller of the computing device, (ii) a configuration module that configures, by the computing device, the group of integrated circuits by simultaneously broadcasting a firmware configuration from the single channel of the interface controller to the group of integrated circuits via the broadcast multiplexer, (iii) a disabling module that disables, by the computing device, the broadcast multiplexer such that each integrated circuit in the group of integrated circuits connects to a separate channel of the interface controller, and (iv) a polling module that periodically polls, by the computing device, the group of integrated circuits based on a predetermined time interval for each integrated circuit in the group of integrated circuits. The system may also include one or more hardware processors that execute the enabling module, the configuration module, the disabling module, and the polling module.

In some examples, the above-described method may be encoded as computer-readable instructions on a computer-readable medium. For example, a non-transitory computer-readable medium may include one or more computer-executable instructions that, when executed by one or more processors of a computing device, may cause the computing device to (i) enable, by the computing device, a broadcast multiplexer such that a group of integrated circuits connects to a single channel of an interface controller of the computing device, (ii) configure, by the computing device, the group of integrated circuits by simultaneously broadcasting a firmware configuration from the single channel of the interface controller to the group of integrated circuits via the broadcast multiplexer, (iii) disable, by the computing device, the broadcast multiplexer such that each integrated circuit in the group of integrated circuits connects to a separate channel of the interface controller, and (iv) periodically poll, by the computing device, the group of integrated circuits based on a predetermined time interval for each integrated circuit in the group of integrated circuits.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
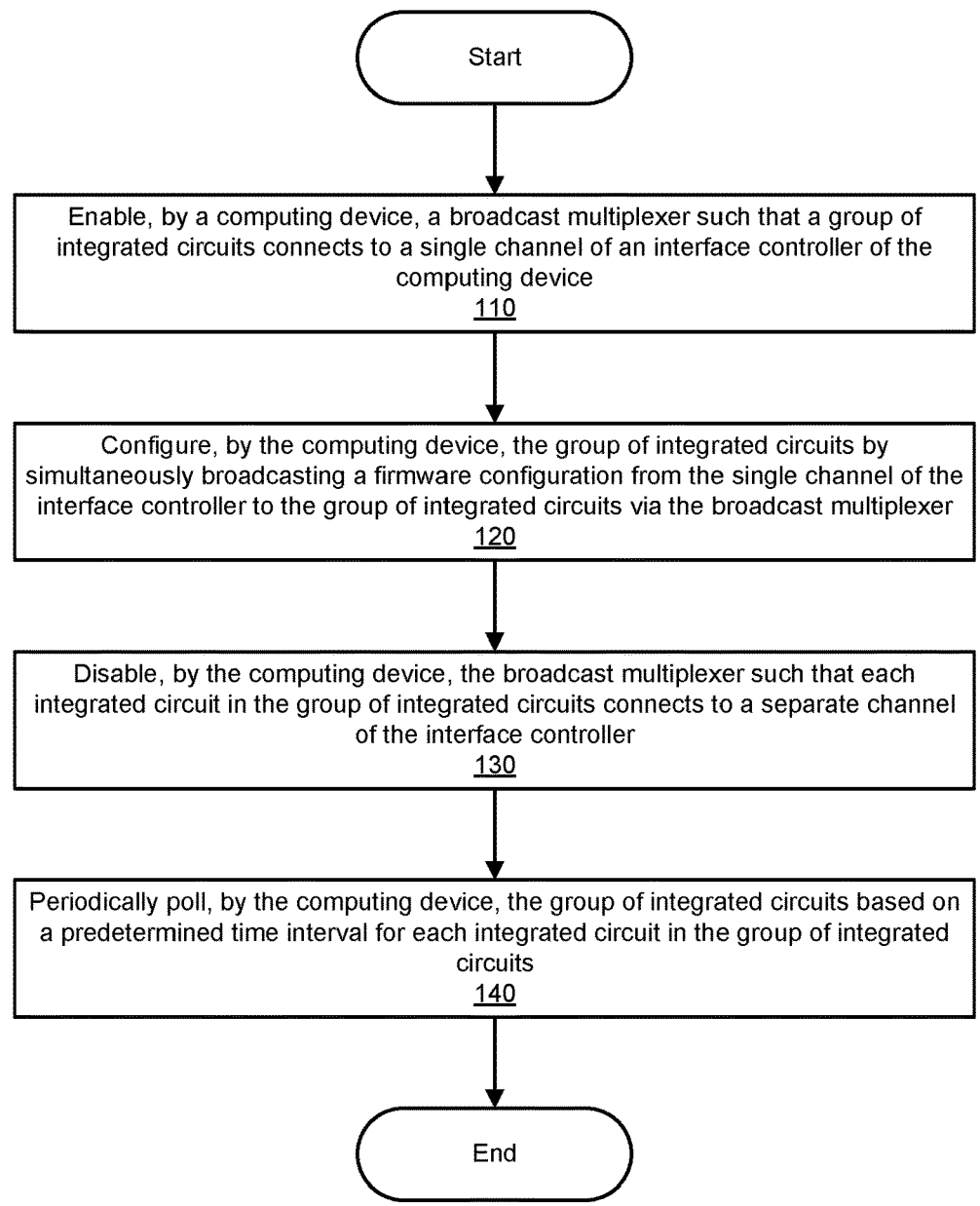
FIG. 1 is a flow diagram of an example method for optimizing telemetry configurations.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for optimizing telemetry configurations. As will be explained in greater detail below, embodiments of the instant disclosure may enable a telemetry acceleration field-programmable gate array (FPGA) to perform parallel firmware configurations for multiple telemetry devices while flexibly optimizing telemetry polling by combining broadcast multiplexers (MUXes) with interface controllers, such as Management Data Input/Output (MDIO) controllers. For example, by enabling one or more broadcast MUXes, a host central processing unit (CPU) may aggregate connect multiple application-specific integrated circuits (ASICs) to a single channel of an MDIO controller for simultaneous firmware configuration. During a broadcast mode, firmware may be simultaneously downloaded for all devices with the same address. By disabling the broadcast MUX when firmware broadcasting is complete, the host CPU may then enable each channel to connect to a single ASIC. By connecting each telemetry device to one channel, the systems and methods described herein may also increase control over collecting telemetry data.

Additionally, telemetry acceleration may be flexibly implemented with one or more MDIO controllers and/or one or more broadcast MUXes based on telemetry requirements. For example, with two interface controllers on an FPGA, the disclosed systems and methods may split the telemetry devices into two groups that are polled at different time intervals. The disclosed systems and methods may also split the telemetry devices based on types of data or the sizes of the telemetry data being collected. The system and methods described herein may then run parallel threads for the multiple controllers. Furthermore, the disclosed systems and methods may divide the telemetry devices based on types of devices and design broadcast MUXes to handle different types of devices.

In addition, the systems and methods described herein may improve the functioning of a computing device by reducing host CPU load and FPGA resource requirements. These systems and methods may also improve the fields of system efficiency and parallel computing by performing simultaneous firmware download and enabling efficient telemetry support to improve system bootup and runtime performance. Thus, the disclosed systems and methods may improve over typical methods of configuring and controlling telemetry devices.

The following will provide, with reference to FIG. 1, detailed descriptions of computer-implemented methods for optimizing telemetry configurations. Detailed descriptions of a corresponding example system will be provided in connection with FIG. 2. Detailed descriptions of an example configuration of an example interface controller, an example broadcast multiplexer, and example telemetry devices during firmware download will be provided in connection with FIG. 3. In addition, detailed descriptions of the example configuration during telemetry polling will be provided in connection with FIG. 4. Detailed descriptions of a different example configuration with multiple example interface controllers will also be provided in connection with FIG. 5. Furthermore, detailed descriptions of another example configuration with multiple example interface controllers and multiple example broadcast multiplexers will be provided in connection with FIG. 6.

FIG. 1 is a flow diagram of an exemplary computer-implemented method 100 for optimizing telemetry configurations. The steps shown in FIG. 1 may be performed by any suitable computer-executable code and/or computing system, including system 200 illustrated in FIG. 2. In one example, each of the steps shown in FIG. 1 may represent an algorithm whose structure includes and/or is represented by multiple sub-steps, examples of which will be provided in greater detail below.

Figure 2:
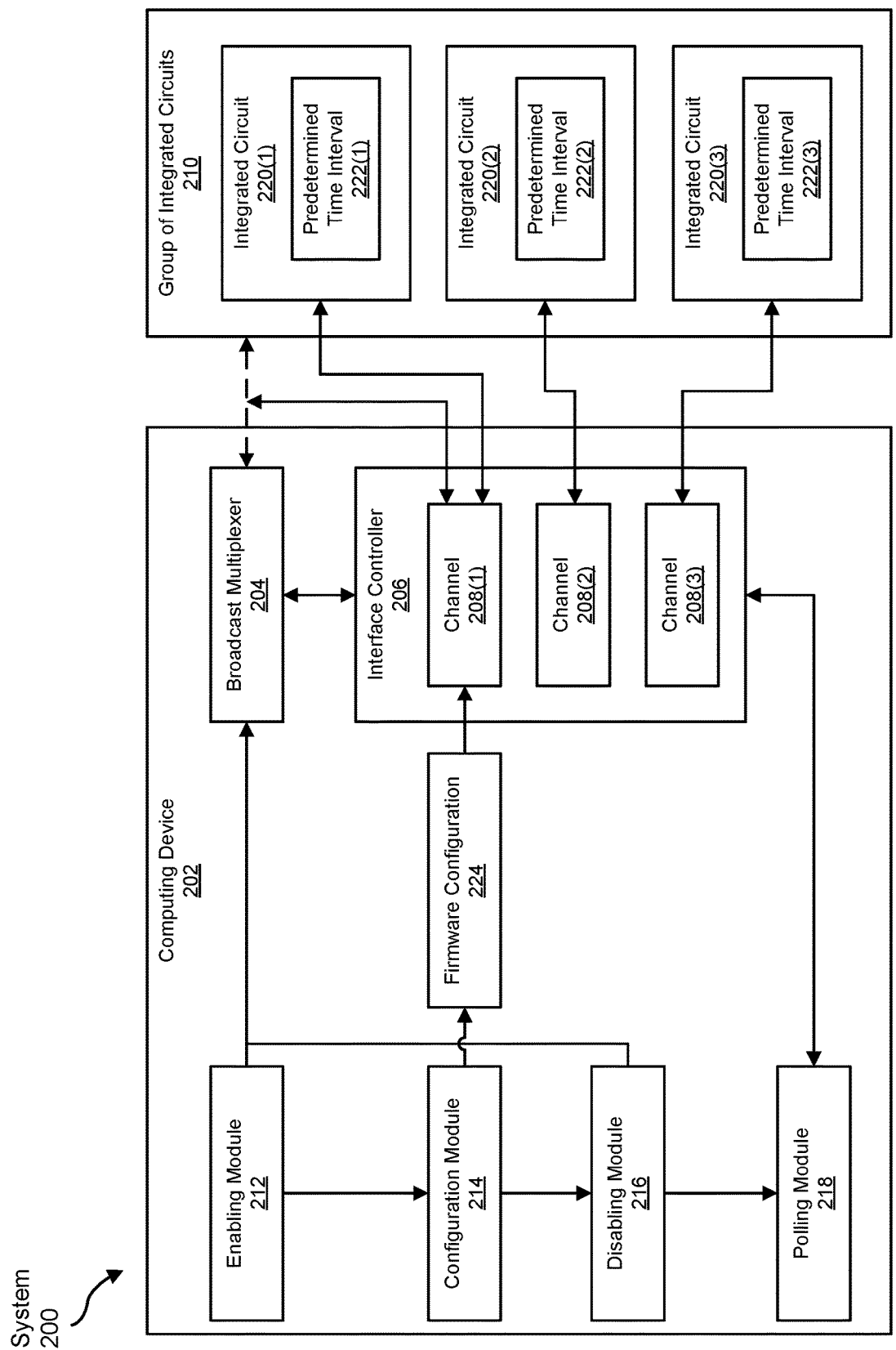
FIG. 2 is a block diagram of an example system for optimizing telemetry configurations.

As illustrated in FIG. 1, at step 110 one or more of the systems described herein may enable, by a computing device, a broadcast multiplexer such that a group of integrated circuits connects to a single channel of an interface controller of the computing device. For example, FIG. 2 is a block diagram of an exemplary system 200 for optimizing telemetry configuration. As illustrated in FIG. 2, an enabling module 212 may, as part of a computing device 202, enable a broadcast multiplexer 204 such that a group of integrated circuits 210 connects to a single channel 208(1) of an interface controller 206.

The systems described herein may perform step 110 in a variety of ways. In one example, the term "telemetry" may refer to a type of data collected by various sensors or other devices and aggregated by a host system to evaluate statistical information and/or to make decisions for the host system. Examples of telemetry devices may include sensors, optical devices, recording devices, networking devices, and/or any other types of devices suitable for detecting or collecting data.

Examples of computing device 202 may include, without limitation, network devices, routers (such as provider edge routers, hub routers, spoke routers, autonomous system boundary routers, and/or area border routers), switches, hubs, modems, bridges, repeaters, gateways (such as broadband network gateways), multiplexers, network adapters, network interfaces, laptops, tablets, desktops, servers, cellular phones, personal digital assistants (PDAs), multimedia players, embedded systems, wearable devices, gaming consoles, portions of one or more of the same, variations or combinations of one or more of the same, and/or any other suitable computing devices. Additional examples of such devices include, without limitation, application servers and/or database servers configured to provide various database services and/or run certain software applications, such as media storage and streaming services.

In some examples, computing device 202 may be equipped with circuitry and/or hardware configured and/or programmed to perform one or more of the tasks and/or actions described herein. For example, such circuitry may include and/or represent one or more electrical and/or electronic circuits capable of processing, applying, modifying, transforming, transmitting, receiving, and/or executing instructions and/or data for computing device 202. In one example, such circuitry may access, read, write, and/or allocate memory in connection with optimizing telemetry configurations. Additionally or alternatively, such circuitry may receive, handle, process, and/or forward traffic (e.g., data and/or control packets) on computing device 202.

In some embodiments, computing device 202 may be in communication with other computing devices via a network. For example, computing device 202 may represent a network interface connecting telemetry devices to a server network. In such embodiments, the network may include and/or represent any medium or architecture capable of facilitating communication or data transfer. In one example, the network may include and/or represent wireless or wired connections. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like.

In some examples, the term "broadcast multiplexer" may refer to a computing component capable of performing multiplexer and/or demultiplexer functions, wherein multiplexer functions enable switching between multiple inputs to a single output and demultiplexer functions enable switching between multiple outputs from a single input. In some examples, the terms "circuit" and "integrated circuit" may refer to a computer chip or other collections of electronic circuits. Examples of integrated circuits may include, without limitation, ASICs customized for telemetry devices, Ethernet physical (PHY) devices (e.g., retimers, gearboxes, and/or repeaters), digital signal processors (DSPs), sensors, optical instruments, FPGAs, complex programmable logic devices (CPLDs), computing devices similar to computing device 202, networking devices, and/or any other suitable device or component. In some examples, the term "interface controller" may refer to a software or hardware component that manages an interface component acting as a connection point between two or more devices or networks. Examples of interface controllers include, without limitation, MDIO controllers, Inter-Integrated Circuit (I2C) controllers, Serial Peripheral Interface (SPI) controllers, and/or any other protocol controllers.

In one embodiment, group of integrated circuits 210 may include integrated circuits 220(1)-(3). In this embodiment, one or more of integrated circuits 220(1)-(3) may include ASICs of telemetry devices that collect telemetry data for computing device 202. In some embodiments, broadcast multiplexer 204 and interface controller 206 may be integrated into an FPGA of computing device 202 for telemetry acceleration. In some examples, the term "field-programmable gate array" or "FPGA" may refer to a type of integrated circuit or ASIC designed to be configurable or reconfigurable for flexible computing functions. In some examples, the term "telemetry acceleration" may refer to a function to improve the workload performance and/or speed of collecting or using telemetry data.

Figure 3:
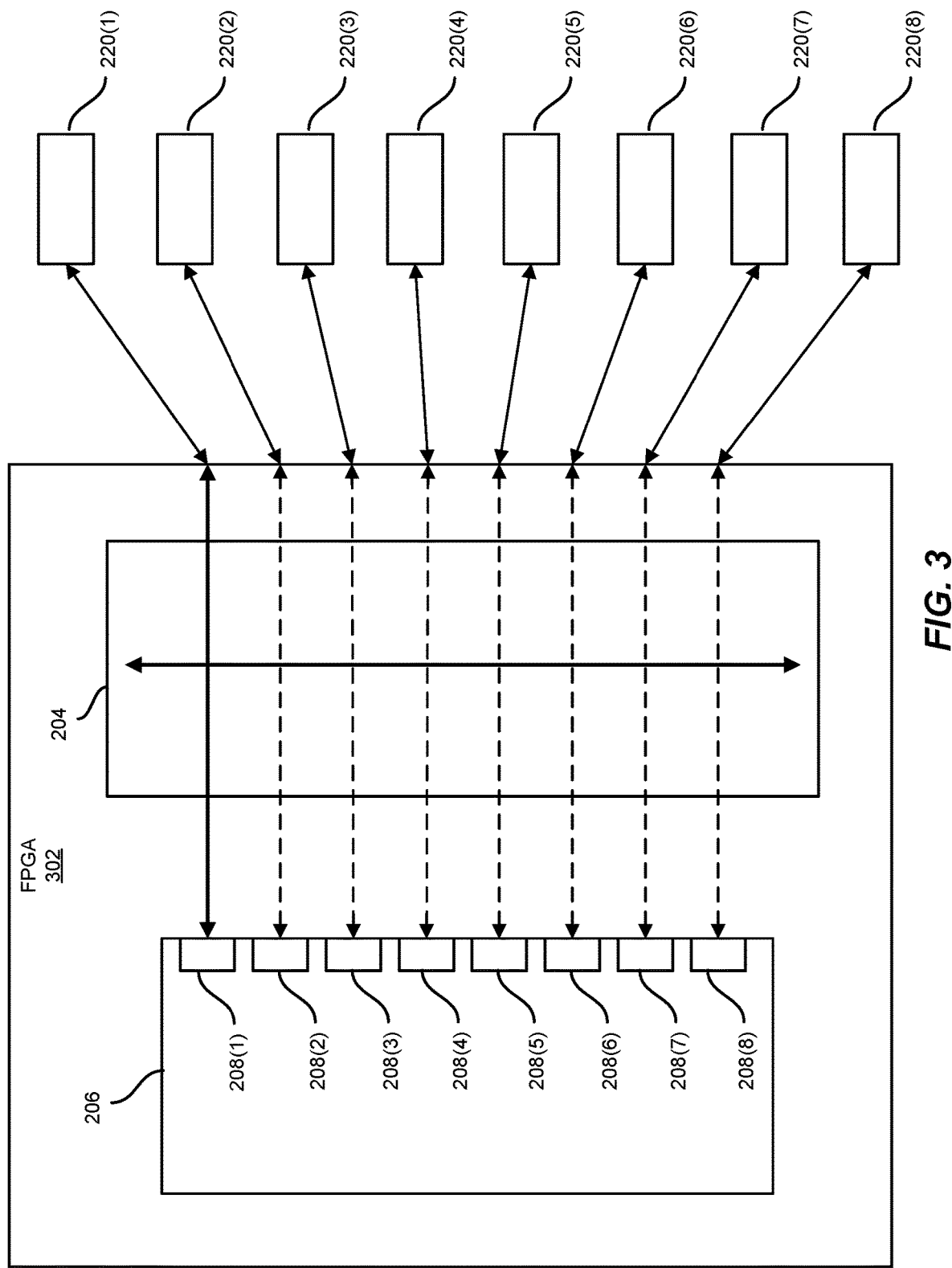
FIG. 3 is a block diagram of an example configuration of an example interface controller, an example broadcast multiplexer, and example telemetry devices during firmware download.

As illustrated in FIG. 3, an FPGA 302 may be configured with broadcast multiplexer 204 and interface controller 206. In this example, interface controller 206 may include channels 208(1)-(8). In this example, FPGA 302 may enable broadcast multiplexer 204, which may then switch between integrated circuits 220(1)-(8) to connect to channel 208(1) of interface controller 206. In this example, broadcast multiplexer 204, when activated or enabled, may act as a switch between inputs from integrated circuits 220(1)-(8) and an output to channel 208(1) and/or input from channel 208(1) to outputs to integrated circuits 220(1)-(8). In the example of FIG. 2, a dotted line between broadcast multiplexer 204 and group of integrated circuits 210 may indicate the ability of activated broadcast multiplexer 204 to switch from multiple channels to single channel 208(1) such that data between computing device 202 and all integrated circuits of group of integrated circuits 210, including integrated circuits 220(1)-(3), flow through channel 208(1).

Returning to FIG. 1, at step 120, one or more of the systems described herein may configure, by the computing device, the group of integrated circuits by simultaneously broadcasting a firmware configuration from the single channel of the interface controller to the group of integrated circuits via the broadcast multiplexer. For example, a configuration module 214 may, as part of computing device 202 in FIG. 2, configure group of integrated circuits 210 by simultaneously broadcasting a firmware configuration 224 from channel 208(1) of interface controller 206 to group of integrated circuits 210 via broadcast multiplexer 204.

The systems described herein may perform step 120 in a variety of ways. In some examples, the term "firmware configuration" may refer to a specific firmware version and/or a user-defined configuration for the firmware of a computing device or the process of configuring the same. In some embodiments, configuration module 214 may configure group of integrated circuits 210 by pushing a firmware download to group of integrated circuits 210, booting up group of integrated circuits 210, updating a previous firmware configuration of group of integrated circuits 210, and/or performing a checksum on firmware configuration 224 for each of integrated circuits 220(1)-(3) in group of integrated circuits 210. In some examples, the term "checksum" may refer to a calculated value representing a block of data used to verify data integrity. For example, a checksum of firmware configuration 224 may determine whether the correct firmware version is correctly configured on a specific device.

In some examples, firmware configuration may be performed during bootup of computing device 202. In other examples, firmware configuration may be performed during runtime of computing device 202 based on firmware updates or changes to user configurations. By simultaneously broadcasting firmware configuration 224 to group of integrated circuits 210 via broadcast multiplexer 204, configuration module 214 may perform firmware configuration for multiple telemetry devices in approximately the amount of time taken for a single firmware configuration.

Returning to FIG. 1, at step 130, one or more of the systems described herein may disable, by the computing device, the broadcast multiplexer such that each integrated circuit in the group of integrated circuits connects to a separate channel of the interface controller. For example, a disabling module 216 may, as part of computing device 202 of FIG. 2, disable broadcast multiplexer 204 such that each of integrated circuits 220(1)-(3) in group of integrated circuits 210 connects to separate channels 208(1)-(3) of interface controller 206, respectively.

Figure 4:
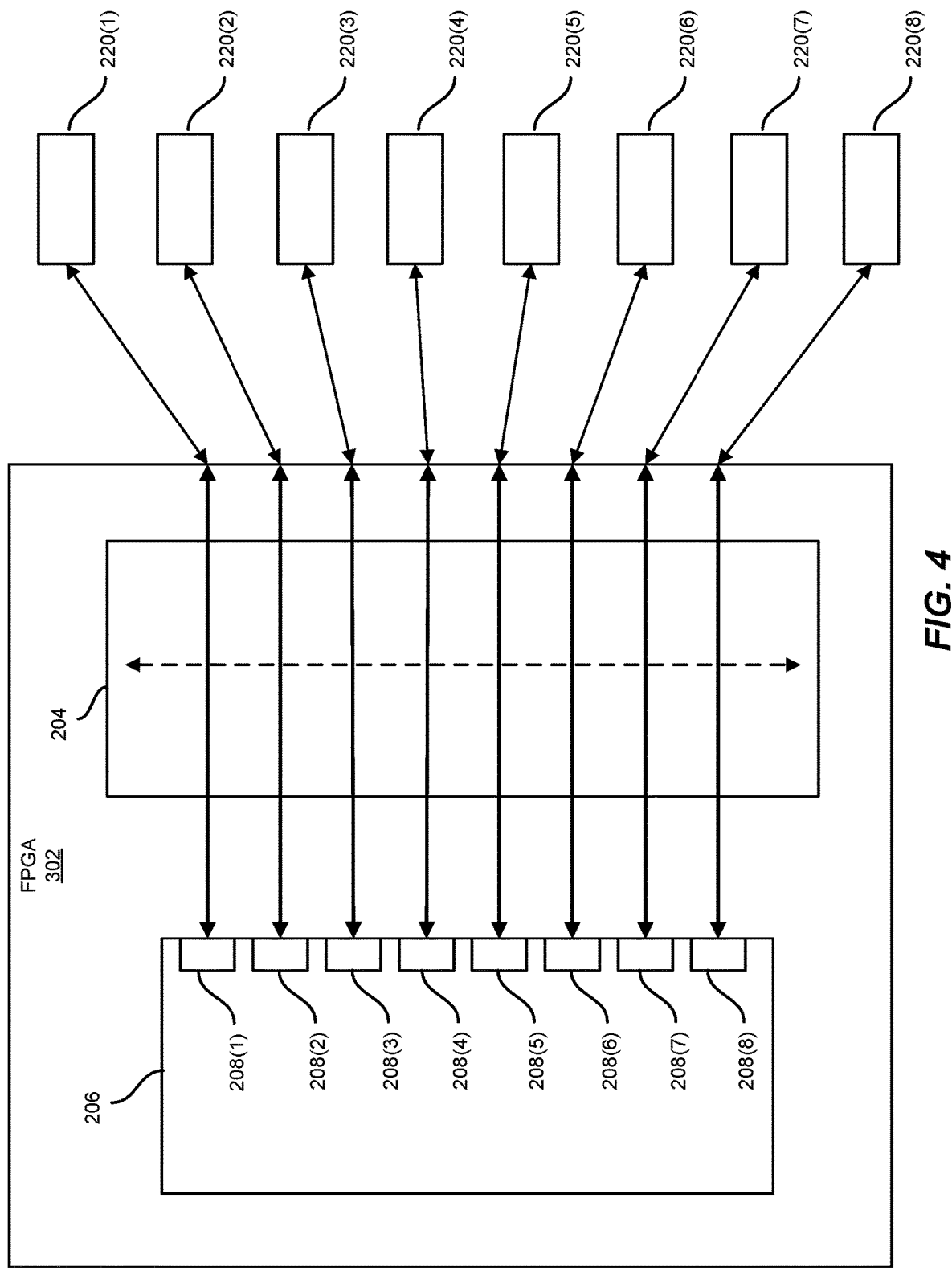
FIG. 4 is a block diagram of the example configuration during telemetry polling.

The systems described herein may perform step 130 in a variety of ways. As illustrated in FIG. 4, disabling module 216 may disable or deactivate broadcast multiplexer 204. In this example, integrated circuits 220(1)-(8) may connect directly to channels 208(1)-(8), respectively. As shown in FIG. 4, connections between integrated circuits 220(2)-(8)

and channels 208(2)-(8) are represented by solid lines in contrast to the dotted lines of FIG. 3, which are inactive connections.

Returning to FIG. 1, at step 140, one or more of the systems described herein may periodically poll, by the computing device, the group of integrated circuits based on a predetermined time interval for each integrated circuit in the group of integrated circuits. For example, a polling module 218 may, as part of computing device 202 in FIG. 2, periodically poll group of integrated circuits 210 based on predetermined time intervals 222(1)-(3) for integrated circuits 220(1)-(3), respectively.

The systems described herein may perform step 140 in a variety of ways. In some examples, the term "polling" may refer to a process of checking the state of a connected computing device. In the example of FIG. 2, each channel of interface controller 206 may accept telemetry data from a single integrated circuit or device. Similar, in the example of FIG. 4, channels 208(1)-(8) may poll and receive telemetry data from each of integrated circuits 220(1)-(8), respectively. In the example of FIG. 2, predetermined time interval 222(1) may represent a different timing from predetermined time interval 222(2) and/or predetermined time interval 222(3). Thus, polling module 218 may poll integrated circuit 220(1) at a different time from integrated circuit 220(2) and/or integrated circuit 220(3). In this example, computing device 202 may then aggregate telemetry data polled at different times or may aggregate telemetry data from the same time period.

In some embodiments, the systems and methods disclosed herein may further include configuring FPGA 302 with a number of interface controllers, wherein the number of interface controllers may be determined by a number of types of data from group of integrated circuits 210, a number of data sizes transmitted by group of integrated circuits 210, and/or a number of predetermined time intervals of group of integrated circuits 210, such as three different intervals in the example of FIG. 2. In these embodiments, the systems and methods disclosed herein may further include dividing group of integrated circuits 210 between the number of interface controllers such that each integrated circuit in group of integrated circuits 210 connects to a single interface controller based on a type of data of each integrated circuit, a data size transmitted by each integrated circuit, and the predetermined time interval for each integrated circuit.

Figure 5:
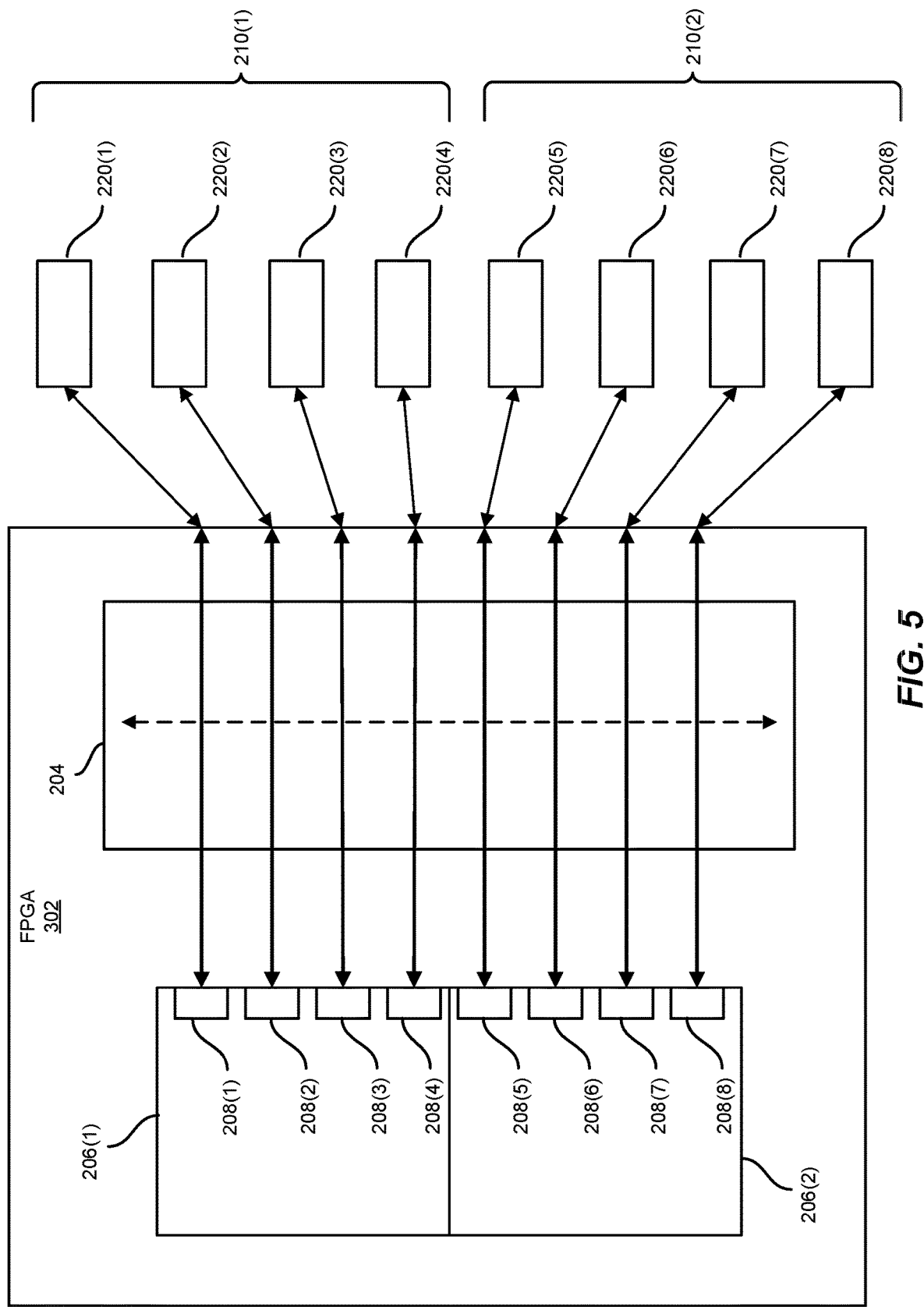
FIG. 5 is a block diagram of a different example configuration with multiple example interface controllers.

As illustrated in FIG. 5, FPGA 302 may be configured with an interface controller 206(1) and an interface controller 206(2). In this example, a group of integrated circuits 210(1) may have a predetermined time interval of 5 seconds and transmit data in increments of 256 bytes. In contrast, a group of integrated circuits 210(2) may have a predetermined time interval of 7 seconds and transmit data in increments of 512 bytes. In this example, the disclosed systems and methods may determine at least two separate interface controllers are needed. In this example, interface controller 206(1) may poll group of integrated circuits 210(1) every 5 seconds, and interface controller 206(2) may separately poll group of integrated circuits 210(2) every 7 seconds. In other examples, various other amounts of interface controllers may be implemented on FPGA 302 to handle different polling requirements to meet time and data limits. Additionally, during firmware download, groups of integrated circuits 210(1)-(2) may all connect to a single channel, such as channel 208(1), or may be split between interface controllers 206(1)-(2) using channel 208(1) and channel 208(5), respectively.

In the above embodiments, polling module 218 may periodically poll group of integrated circuits 210 of FIG. 2 by running parallel threads for the number of interface controllers. In some examples, the terms "parallel threading" or "multi-threading" may refer to a process of executing multiple programmed instructions at the same time by scheduling the programmed instructions in parallel or concurrently. In the example of FIG. 5, FPGA 302 may execute two parallel threads to enable polling through both interface controller 206(1) and interface controller 206(2). By running parallel threads, the disclosed systems and methods may perform more timely polling of telemetry data from split groups of integrated circuits 210(1)-(2). In this example, the disclosed systems and methods may also calculate and implement an optimal number of interface controllers to reduce a host CPU load with minimal parallel threading.

Figure 6:
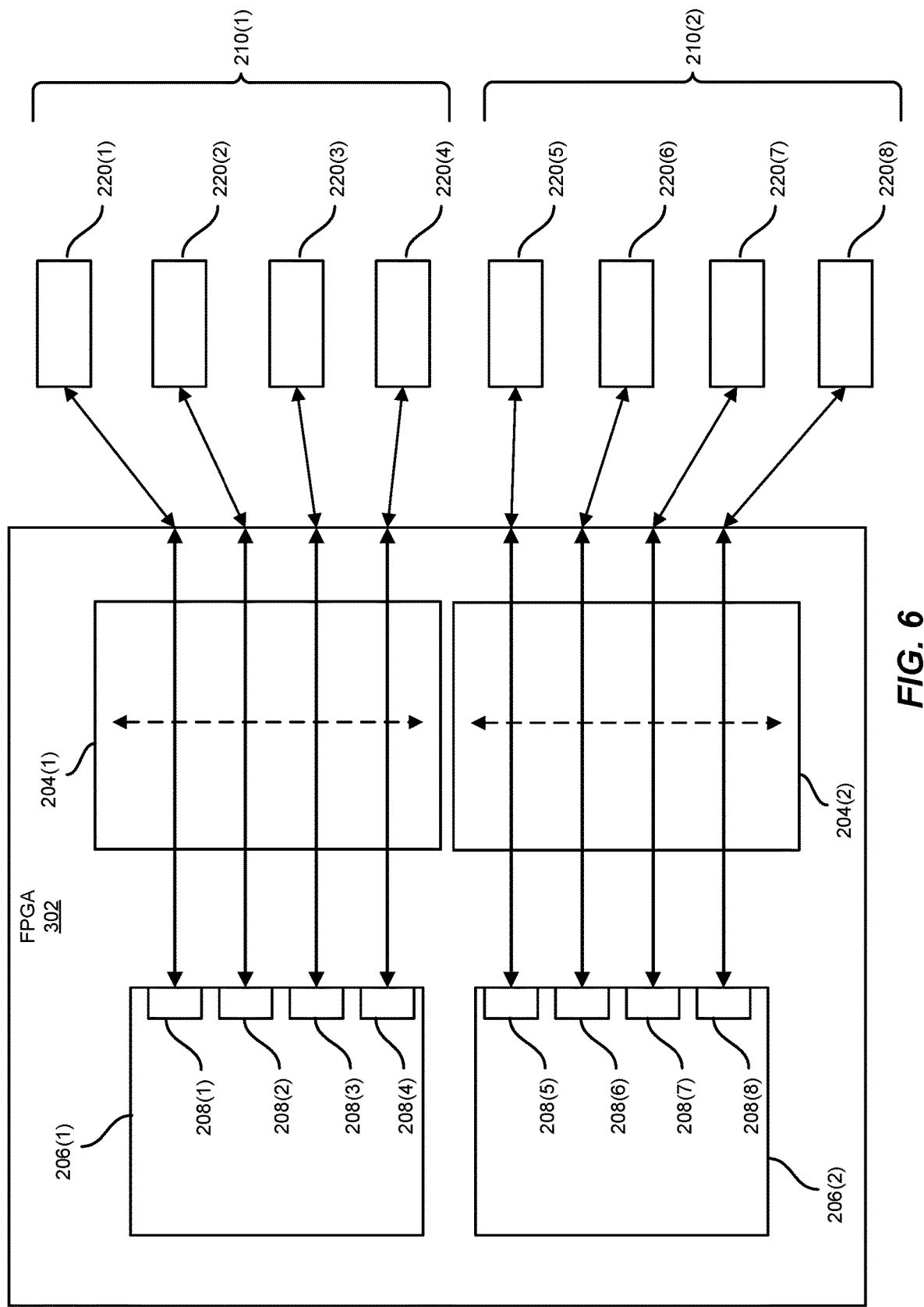
FIG. 6 is a block diagram of another example configuration with multiple example interface controllers and multiple example broadcast multiplexers.

In some embodiments, the systems and methods disclosed herein may further include configuring FPGA 302 with a number of broadcast multiplexers, wherein the number of broadcast multiplexers is determined by a number of types of integrated circuits in group of integrated circuits 210. As illustrated in FIG. 6, group of integrated circuits 210(1) may run on a different type of telemetry devices from group of integrated circuits 210(2). For example, integrated circuits 220(1)-(4) may collect network data, and integrated circuits 220(5)-(8) may collect optical data. In this example, a broadcast multiplexer 204(1) may be designed to interface with network devices, and a broadcast multiplexer 204(2) may be designed to interface with optics devices. In this example, broadcast multiplexers 204(1)-(2) may broadcast different types of firmware and/or may collect different types of telemetry data. Additionally, in the example of FIG. 6, broadcast multiplexers 204(1)-(2) may provide connection splitting for interface controllers 206(1)-(2), respectively. In other examples, the number of broadcast multiplexers and the number of interface controllers may flexibly differ, depending on the requirements of telemetry devices. Furthermore, the disclosed systems and methods may utilize other types of interface controllers or a mixture of interface controllers, depending on the types and requirements of telemetry devices.

As explained above in connection with method 100 in FIG. 1, the disclosed systems and methods may, by combining broadcast MUXes and interface controllers on a single device, such as an FPGA, enable telemetry acceleration along with simultaneous firmware broadcasting. Specifically, the disclosed systems and methods may first enable a broadcast MUX to combine the connections of multiple ASICs of telemetry devices to a single channel of an interface controller. The broadcast MUX may then enable simultaneous firmware download in parallel to the multitude of ASICs during system bootup. The disclosed systems and methods may additionally disable the broadcast MUX during system runtime. Each ASIC may subsequently connect to a separate channel of the interface controller, which enables independent polling and collection of telemetry data. The systems and methods described herein may also implement multiple interface controllers to perform parallel processing of telemetry data, such as by grouping ASICs with similar polling intervals to the same interface controllers. Furthermore, the disclosed systems and methods may flexibly implement multiple broadcast MUXes to enable customizing the MUXes to different types of telemetry devices.

By designing FPGA architecture to perform parallel programming for both firmware configuration and telemetry polling, the disclosed systems and methods may reduce system boot time and accelerate telemetry processing in comparison to sequential methods. Additionally, by reducing the requirements for the number of interface controllers, the disclosed systems and methods may reduce the CPU load and FPGA resources used by interface controllers. Furthermore, by incorporating the logical implementation of broadcast MUXes and interface controllers into FPGA components, the disclosed systems and methods may provide added flexibility for future upgrades or changes based on different telemetry devices and system configurations. Thus, the systems and methods described herein may improve the optimization of telemetry configurations.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs), Application-Specific Integrated Circuits (ASICs), Graphics Processing Units (GPUs), Systems on Chips (SoCs), portions of one or more of the same, variations or combinations of one or more of the same, or any other suitable physical processor.

Although illustrated as separate elements, the modules described and/or illustrated herein may represent portions of a single module or application or multiple modules or applications. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive firmware configurations to be transformed, transform the firmware configurations, output a result of the transformation to an interface controller, use the result of the transformation to distribute firmware configurations through a broadcast multiplexer, and store the result of the transformation to update the firmware of telemetry devices. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    enabling, by a computing device, a broadcast multiplexer such that a group of integrated circuits connects to a single channel of an interface controller of the computing device;
    configuring, by the computing device, the group of integrated circuits by simultaneously broadcasting a firmware configuration from the single channel of the interface controller to the group of integrated circuits via the broadcast multiplexer;
    disabling, by the computing device, the broadcast multiplexer such that each integrated circuit in the group of integrated circuits connects to a separate channel of the interface controller; and periodically polling, by the computing device, the group of integrated circuits based on a predetermined time interval for each integrated circuit in the group of integrated circuits.

2. The method of claim 1, wherein configuring the group of integrated circuits comprises at least one of:
pushing a firmware download to the group of integrated circuits;
booting up the group of integrated circuits;
updating a previous firmware configuration of the group of integrated circuits; and
performing a checksum on the firmware configuration for each integrated circuit in the group of integrated circuits.

3. The method of claim 1, wherein an integrated circuit comprises an application-specific integrated circuit (ASIC) of a telemetry device that collects telemetry data for the computing device.

4. The method of claim 1, wherein the broadcast multiplexer and the interface controller are integrated into a field-programmable gate array (FPGA) of the computing device for telemetry acceleration.

5. The method of claim 4, further comprising configuring the FPGA with a number of interface controllers, wherein the number of interface controllers is determined by at least one of:
a number of types of data from the group of integrated circuits;
a number of data sizes transmitted by the group of integrated circuits; and
a number of predetermined time intervals of the group of integrated circuits.

6. The method of claim 5, further comprising dividing the group of integrated circuits between the number of interface controllers such that each integrated circuit in the group of integrated circuits connects to a single interface controller based on at least one of:
a type of data of each integrated circuit;
a data size transmitted by each integrated circuit; and
the predetermined time interval for each integrated circuit.

7. The method of claim 6, wherein periodically polling the group of integrated circuits comprises running parallel threads for the number of interface controllers.

8. The method of claim 4, further comprising configuring the FPGA with a number of broadcast multiplexers, wherein the number of broadcast multiplexers is determined by a number of types of integrated circuits in the group of integrated circuits.

9. A system comprising:
an enabling module, stored in memory, that enables, by a computing device, a broadcast multiplexer such that a group of integrated circuits connects to a single channel of an interface controller of the computing device;
a configuration module, stored in memory, that configures, by the computing device, the group of integrated circuits by simultaneously broadcasting a firmware configuration from the single channel of the interface controller to the group of integrated circuits via the broadcast multiplexer;
a disabling module, stored in memory, that disables, by the computing device, the broadcast multiplexer such that each integrated circuit in the group of integrated circuits connects to a separate channel of the interface controller;
a polling module, stored in memory, that periodically polls, by the computing device, the group of integrated circuits based on a predetermined time interval for each integrated circuit in the group of integrated circuits; and
at least one processor that executes the enabling module, the configuration module, the disabling module, and the polling module.

10. The system of claim 9, wherein the configuration module configures the group of integrated circuits by at least one of:
pushing a firmware download to the group of integrated circuits;
booting up the group of integrated circuits;
updating a previous firmware configuration of the group of integrated circuits; and
performing a checksum on the firmware configuration for each integrated circuit in the group of integrated circuits.

11. The system of claim 9, wherein an integrated circuit comprises an application-specific integrated circuit (ASIC) of a telemetry device that collects telemetry data for the computing device.

12. The system of claim 9, wherein the broadcast multiplexer and the interface controller are integrated into a field-programmable gate array (FPGA) of the computing device for telemetry acceleration.

13. The system of claim 12, further comprising configuring the FPGA with a number of interface controllers, wherein the number of interface controllers is determined by at least one of:
a number of types of data from the group of integrated circuits;
a number of data sizes transmitted by the group of integrated circuits; and
a number of predetermined time intervals of the group of integrated circuits.

14. The system of claim 13, further comprising dividing the group of integrated circuits between the number of interface controllers such that each integrated circuit in the group of integrated circuits connects to a single interface controller based on at least one of:
a type of data of each integrated circuit;
a data size transmitted by each integrated circuit; and
the predetermined time interval for each integrated circuit.

15. The system of claim 14, wherein the polling module periodically polls the group of integrated circuits by running parallel threads for the number of interface controllers.

16. The system of claim 12, further comprising configuring the FPGA with a number of broadcast multiplexers, wherein the number of broadcast multiplexers is determined by a number of types of integrated circuits in the group of integrated circuits.

17. A non-transitory computer-readable medium comprising one or more computer-executable instructions that, when executed by at least one processor of a computing device, cause the computing device to:
enable, by the computing device, a broadcast multiplexer such that a group of integrated circuits connects to a single channel of an interface controller of the computing device;
configure, by the computing device, the group of integrated circuits by simultaneously broadcasting a firmware configuration from the single channel of the interface controller to the group of integrated circuits via the broadcast multiplexer;

disable, by the computing device, the broadcast multiplexer such that each integrated circuit in the group of integrated circuits connects to a separate channel of the interface controller; and periodically poll, by the computing device, the group of integrated circuits based on a predetermined time interval for each integrated circuit in the group of integrated circuits.

18. The non-transitory computer-readable medium of claim 17, wherein the one or more computer-executable instructions cause the computing device to configure the group of integrated circuits by at least one of:

pushing a firmware download to the group of integrated circuits;

booting up the group of integrated circuits;

updating a previous firmware configuration of the group of integrated circuits; and performing a checksum on the firmware configuration for each integrated circuit in the group of integrated circuits.

19. The non-transitory computer-readable medium of claim 17, wherein an integrated circuit comprises an application-specific integrated circuit (ASIC) of a telemetry device that collects telemetry data for the computing device.

20. The non-transitory computer-readable medium of claim 17, wherein the broadcast multiplexer and the interface controller are integrated into a field-programmable gate array (FPGA) of the computing device for telemetry acceleration.

\* \* \* \* \*